United States Patent [19]

Hattori et al.

[11] 4,223,405
[45] Sep. 16, 1980

[54] MULTITRANSMITTER DIGITAL SIGNALING SYSTEM

[75] Inventors: Takeshi Hattori, Yokohama; Kenkichi Hirade, Yokusuka, both of Japan

[73] Assignee: Nippon Telegraph and Telephone Public Corporation, Tokyo, Japan

[21] Appl. No.: 886,636

[22] Filed: Mar. 15, 1978

[30] Foreign Application Priority Data

Jun. 20, 1977 [JP] Japan .................. 52/72139

[51] Int. Cl.$^2$ .................. H04B 1/04; H04B 7/26
[52] U.S. Cl. .................. 455/105; 455/52; 455/56; 455/59
[58] Field of Search .................. 325/55, 40, 47, 52, 325/54, 45, 56, 154, 145, 156–158, 59, 61, 51; 343/176, 177, 207, 208, 200–203

[56] References Cited

U.S. PATENT DOCUMENTS

| | | | |
|---|---|---|---|
| 2,033,271 | 3/1936 | Aiken | 325/154 |
| 2,278,779 | 4/1942 | Hansell | 325/47 |
| 3,717,814 | 2/1973 | Gans | 325/56 |

OTHER PUBLICATIONS

"A System for Interference Fading Prevention Intropospheric Telecommunications Links," Gusyatinskiy et al., Feb. 1973, vol. 27, #2, pp. 6–9, Telecommunications & Radio Engineering.

Primary Examiner—Marc E. Bookbinder
Attorney, Agent, or Firm—Burgess, Ryan and Wayne

[57] ABSTRACT

In a multitransmitter digital signaling system for mobile communications consisting of a plurality of base stations, different waves are superposed on the digital information signals in adjacent base stations and carrier waves of the same frequency are angularly modulated by the superposed signals at the same modulation index and simultaneously transmitted from the base stations to one service area.

3 Claims, 14 Drawing Figures

$f_d = \pm 4$ KHz
$f_b = 600$ b/s
$f_D = 40$ Hz

- • $\Delta f\,dh = 0$
- ▽ $\pm 0.5$ KHz
- + $\pm 1$ KHz
- △ $\pm 2$ KHz
- □ $\pm 3$ KHz

ERROR RATE CHARACTERISTIC WITH C/N

FIG. 9

$f_b = 600$ b/s
$f_D = 40$ Hz
$\Delta f_d = \pm 4$ Hz
C/N = 8.3 dB

ERROR RATE CHARACTERISTIC WITH $\Delta f$ AS A PARAMETER

FIG. 13 ical signaling ...

MULTITRANSMITTER DIGITAL SIGNALING SYSTEM

BACKGROUND OF THE INVENTION

The present invention relates to a multitransmitter digital signaling system in mobile communications wherein one service area is divided into a plurality of zones, a carrier wave of the same frequency is assigned to all base stations, and angularly or phase modulated by common digital information signals and simultaneously transmitted at respective base stations.

When digital information signals are transmitted to a service area from a plurality of base stations it is preferable that the base stations simultaneously transmit the digital information signals at the same carrier frequency because efficient frequency utilization may be attained and channel switching when a mobile station moves from one zone to another may be eliminated. However this system has a disadvantage that fading occurs in an overlapped zone due to the interference among carrier waves transmitted from different base stations so that degradation of reliability in transmission results.

In order to overcome this problem there has been proposed a system wherein the base station transmitters are synchronized so that the frequencies of the carrier waves may be completely synchronized. However this system is complicated and very expensive. There has also been proposed a system wherein the center frequencies of the carrier waves which are within the same band are offset by a suitable amount as much as, for instance, the signal transmission rate. In this system the frequency fluctuation of carrier waves must be minimized in order to maintain the frequency difference among the carrier waves within a prescribed range. Furthermore when more than four zones are overlapped, the stability requirements of the carrier wave frequency become very severe. Moreover, because of the difference in center frequency of the carrier waves, reliability of signal transmission varies from zone to zone.

There has also been proposed a system wherein the modulation indices or deviation ratios in the adjacent base stations are offset by a suitable amount. However this system still requires high stability of carrier waves when more than four zones are overlapped. Furthermore because maximum frequency deviation is different in each zone, reliability of signal transmission is different from one station to another.

SUMMARY OF THE INVENTION

In view of the above, one of the objects of the present invention is to provide a multitransmitter digital signaling system wherein transmitters and receivers are very simple in construction, carrier frequency stability may be relaxed and the degradation in error rate due to interference fading among waves may be avoided.

Briefly stated, to the above and other ends the present invention provides a multitransmitter digital signaling method and system wherein different waves are superposed on the common digital information signals in adjacent base stations and the carrier waves of the same frequency are modulated by the superposed waves at the same index and simultaneously transmitted from a plurality of base stations to one service area.

DESCRIPTION OF THE PREFERRED EMBODIMENTS

Figure 1:
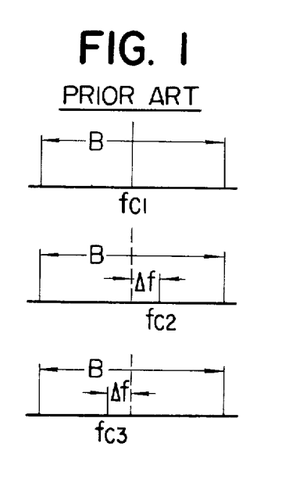
FIGS. 1 and 2 are schematic views used for the explanation of the prior art systems.
Figure 2:
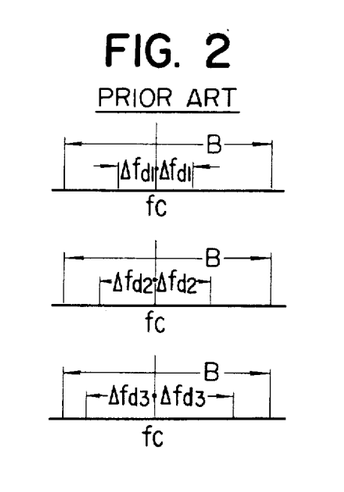

Prior Art, FIGS. 1 and 2

FIG. 1 shows a prior art carrier allocation system wherein the center frequencies of adjacent base stations in a common service area are offset from each other by a suitable frequency. That is, the base station are alloted $f_{c1}$, $f_{c2}$ and $f_{c3}$ offset by $\Delta f$ as center frequencies in a common band B. With this system high stability of the carrier frequency must be maintained in order to maintain $\Delta f$ within a predetermined range. As a result when more than four zones are overlapped, tight frequency stability tolerances (less than $1 \times 10^{-7}$) must be maintained. Therefore expensive equipment must be used. Furthermore because of the difference in the center frequencies of the carrier waves, signal transmission reliability is different from one station to another.

FIG. 2 schematically shows a prior art system wherein the same center frequency is assigned to all stations, but the modulation indexes or deviation ratios are offset among the adjacent stations. FIG. 2 shows the spectrum allocation for three base stations. That is, three base stations are assigned the same band B, the same center frequency $f_c$ and different maximum frequency deviation $\Delta f_{d1}$, $\Delta f_{d2}$ and $\Delta f_{d3}$, respectively. With this system high carrier stability must be also maintained, and especially when four adjacent zones are overlapped, a high degree of frequency stability is required. Furthermore, because of the different maximum frequency deviations in respective zones, signal transmission reliability is different from one station to another.

The Invention

Figure 3:
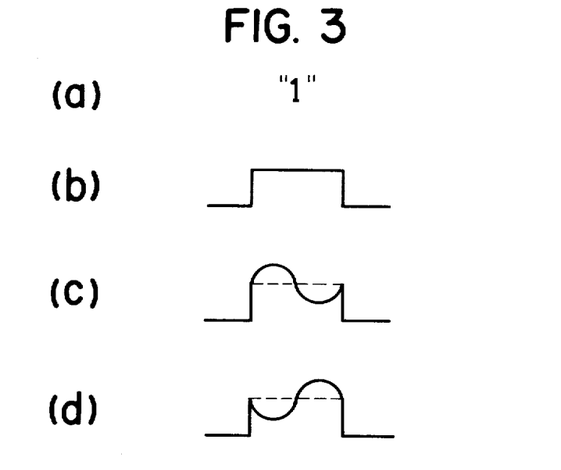
FIG. 3 is a view used for the explanation of the underlying principle of the present invention.

The underlying principle of the present invention will be described with reference to FIG. 3 wherein one time slot (FIG. 3b) is alloted to digital information signal "1" (FIG. 3a). According to the present invention different waveforms are superposed on the digital information signal in respective base stations.

First the superposition of a sinusoidal wave will be described. A sinusoidal wave is expressed by $$\gamma \sin(\omega_0 t + \theta) \tag{1}$$

where
$\gamma$ = amplitude,
$\omega_0$ = angular frequency, and
$\theta$ = initial phase.

These parameters $\gamma$, $\omega_0$ and $\theta$ may be selected suitably depending upon the number of base stations, but for the sake of simplicity $\theta = 0$ and 180° in FIG. 3.

The superposition of a sinusoidal wave on digital signals may avoid degradation in overlapped zones. Let us assume that the wave emitted from a first station be expressed by $U_1(t)$ and the wave emitted from a second base station, by $U_2(t)$. Then the received waves may be expressed as follows:

$$U_1(t) = R_1 \cos[\omega_c t + \Omega d\{\int (m(t) + \phi_1(t))dt\} + \theta_1] \tag{2}$$

and $$U_2(t) = R_2 \cos[\omega_c t + \Omega d\{\int (m(t) + \phi_2(t))dt\} + \theta_2] \tag{3}$$

where
$\omega_c$ = angular frequency of carrier,
$R_1$, $R_2$ = amplitudes,
$\Omega d$ = maximum frequency deviation,
$m(t)$ = base band signal which is equal to $+1$ or $-1$,
$\phi_1(t)$, $\phi_2(t)$ = superposed waveforms, and
$\theta_1$, $\theta_2$ = phases.

Therefore the combined received wave in an overlapped zone is expressed by $$U_0(t) = U_1(t) + U_2(t) \tag{4}$$

The mean power $\epsilon$ of $U_0(t)$ in one time slot is given by $$\epsilon = \frac{1}{T} \int_0^T U_0^2(t) dt \tag{5}$$

where T = one time slot interval.
Substituting Eq. (5) into Eqs. (2), (3) and (4) and neglecting the double frequency terms, we have $$\epsilon = \tfrac{1}{2}(R_1^2 + R_2^2) + \frac{R_1 R_2}{T} \int_0^T \cos\left[\Omega d \left(\int_0^T (\phi_1(t) - \phi_2(t))dt\right) + (\theta_1 - \theta_2)\right] dt \tag{6}$$

$\theta_1$ and $\theta_2$ are independent of each other and may be random values, and optimum conditions may be attained when the mean power $\epsilon$ is independent of $\theta_1$ and $\theta_2$ but is dependent only on $R_1$ and $R_2$ because the lower the mean power $\epsilon$ the higher the error rate becomes. When the mean power $\epsilon$ is dependent upon $\theta_1$ and $\theta_2$, it will becomes lower even with high amplitudes $R_1$ and $R_2$. As a result the degradation in characteristics results.

The conditions for the second term of Eq. (6) being always equal to zero regardless of the values $\theta_1$ and $\theta_2$ are $$\int_0^T \cos\left[\Omega d \int_0^T (\phi_1(t) - \phi_2(t))dt\right] dt = 0 \tag{7}$$

and $$\int_0^T \sin\left[\Omega d \int_0^T (\phi_1(t) - \phi_2(t))dt\right] dt = 0 \tag{8}$$

Figure 4:
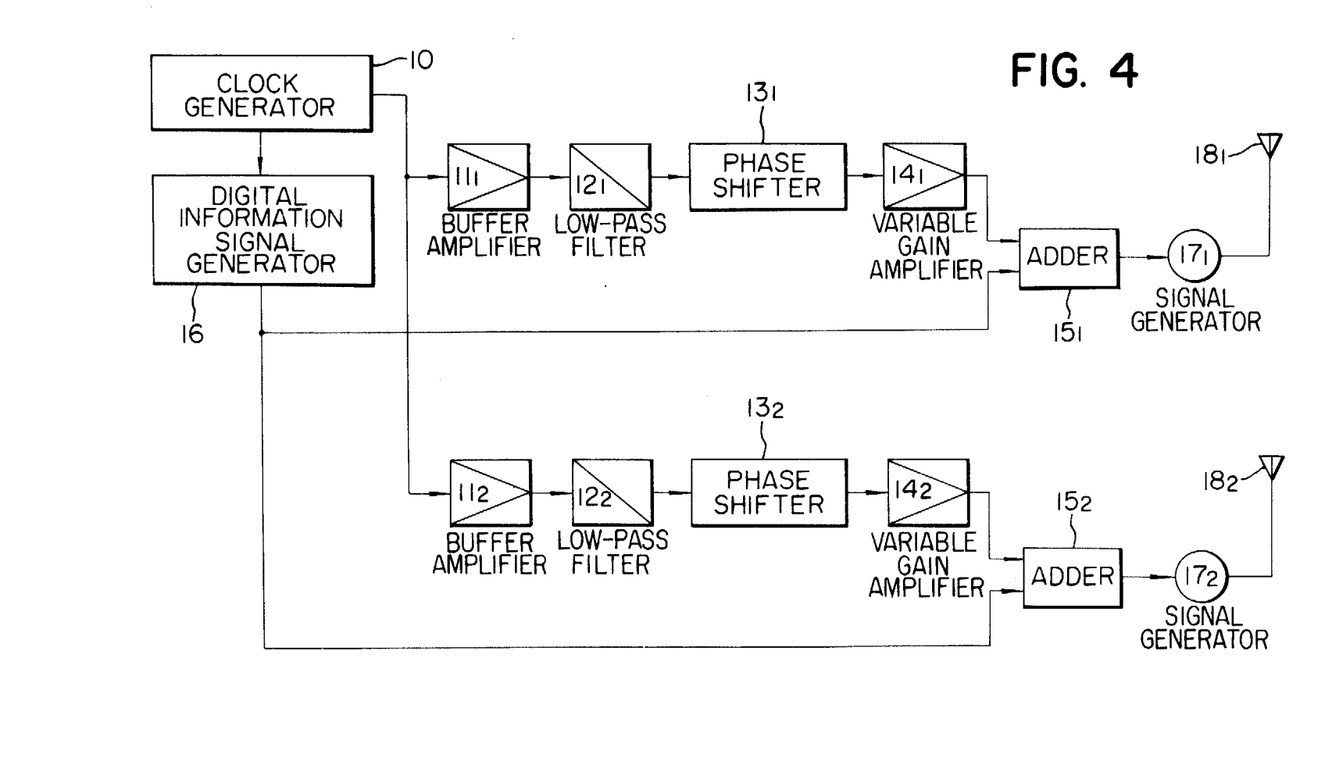
FIG. 4 is a block diagram of transmitters of a first embodiment of the present invention.
Figure 5:
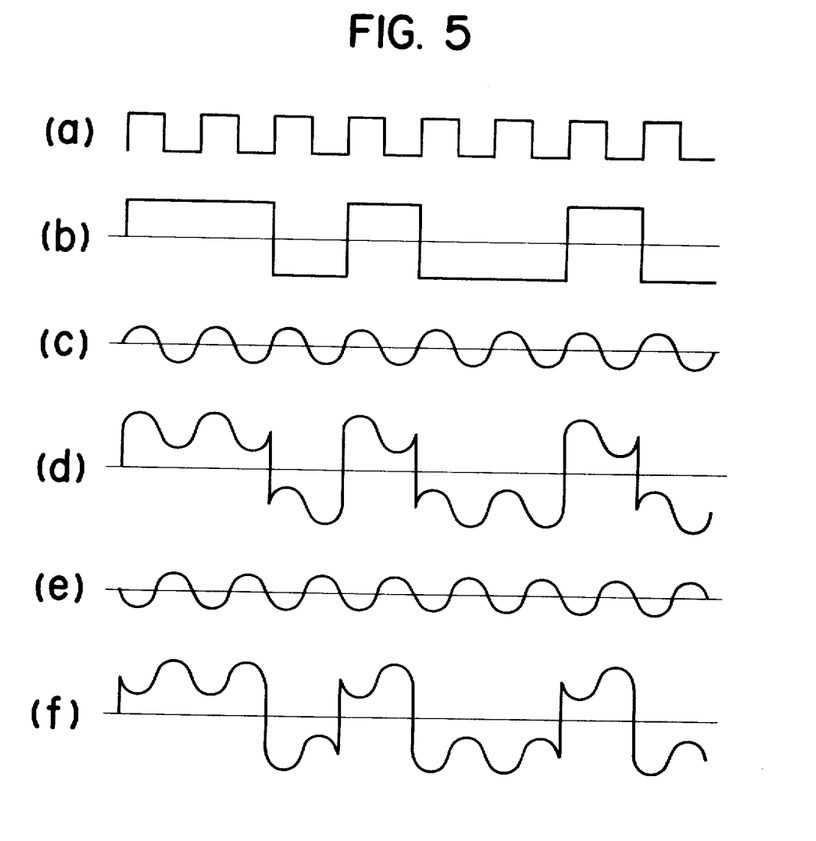
FIG. 5 shows various waveforms used for the explanation of the mode of operation of the first embodiment.

And Eqs. (7) and (8) must be simultaneously satisfied. The conditions for simultaneously satisfying Eqs. (7) and (8) are for instance $$\phi_1(t) = \beta \sin \omega_0 t \tag{9}$$

$$\phi_2(t) = -\beta \sin \omega_0 t \tag{10}$$

where satisfied the following equation $J_0(\beta) = 0$
$J_0(\ )$ = Bessel function of order of zero
$\omega_0 = 2\pi/T$ Next a first embodiment of the present invention based upon the above underlying principle will be described with reference to FIG. 4. Clock signals [See FIG. 5(a)] from a clock generator 10 is amplified by a buffer amplifier $11_1$ of one base station and fed into a low-pass filter $12_1$ where the clock signals are converted into a sinusoidal waveform. Thereafter the sinusoidal waveform is phase shifted with a phase shifter $13_1$ as shown at FIG. 5(c) and then amplitude adjusted with a variable gain amplifier $14_1$ and fed into an adder $15_1$ to which is also fed the digital information signals [FIG. 5(b)] from a digital information signal generator 16. Therefore the sinusoidal waveform is superposed on the digital information signals as shown in FIG. 5(d), and the digital information signals superposed by the sinusoidal waveform angular by modulate a carrier wave in a signal generator $17_1$ and transmitted from an antenna $18_1$.

The clock signals from the clock generator 10 are also fed to a buffer amplifier $11_2$ of another base station, and the output from the buffer amplifier $11_2$ is converted in a low-pass filter $12_2$ into a sinusoidal wave and fed into a phase shifter $13_2$. The output from the phase shifter $13_2$ is out of phase by 180° relative to the output from the phase shifter $13_1$ [See FIGS. 5(c) and 5(e)], and is fed through a variable gain amplifier $14_2$ to an adder $14_2$. Digital information signals from the generator 16 are also applied to the adder $15_2$ and superposed by the sinusoidal wave as shown at FIG. 5(f). The output from the adder $15_2$ angular by modulates a carries wave in a signal generator $17_2$ and transmitted from an antenna $18_2$.

Figure 6:
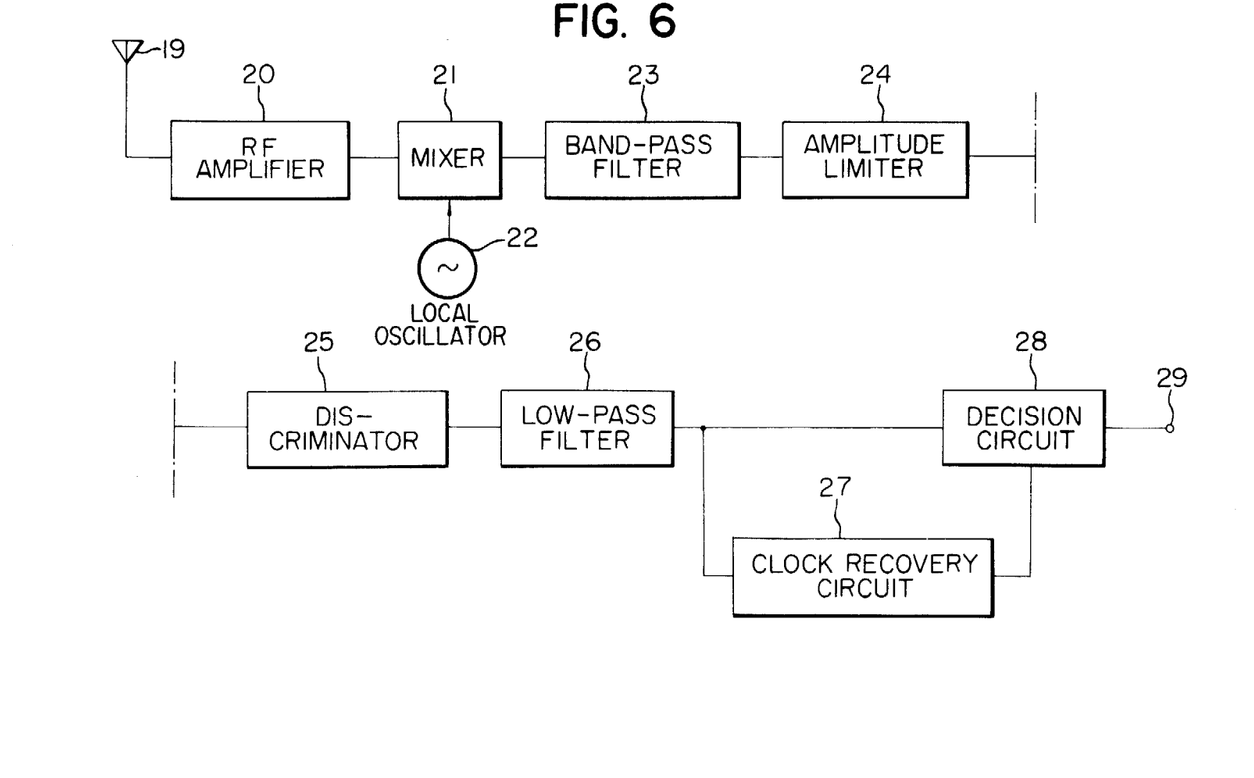
FIG. 6 is a block diagram of a receiver of the first embodiment.

Thus modulated and transmitted waves are received by an antenna 19 of a mobile station and fed into a RF amplifier 20. The output from the amplifier 20 is mixed in a mixer 21 with the output from a local oscillator 22, and the output from the mixer 21 is fed through a bandpass filter 23 and an IF stage to a demodulator consisting of an amplitude limiter 24 and a discriminator 25. The output from the demodulator is fed through a lowpass filter 26 to a decoder consisting of a clock recovery circuit 27 and a decision circuit 28, and the output is derived from an output terminal 29.

Figure 7:
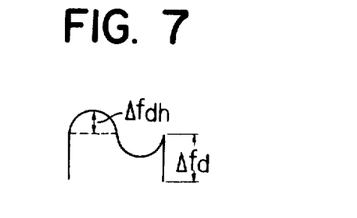
FIG. 7 shows an emitted wave.
Figure 8:
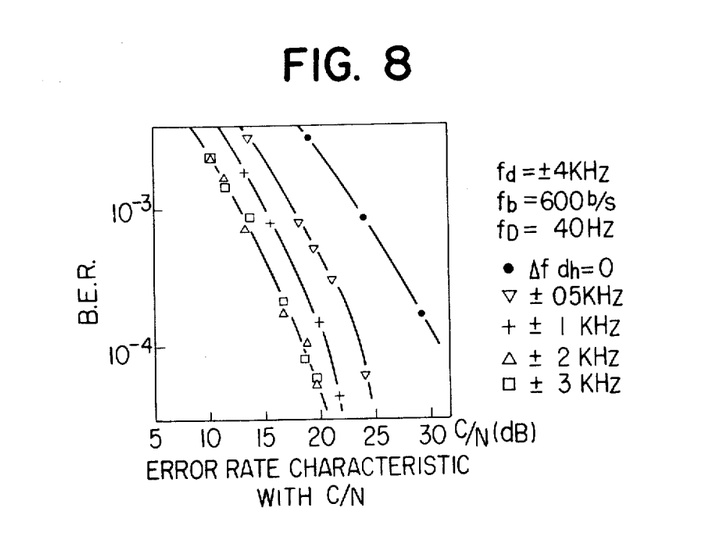
FIG. 8 shows the relationship between the error rate and C/N.
Figure 9:
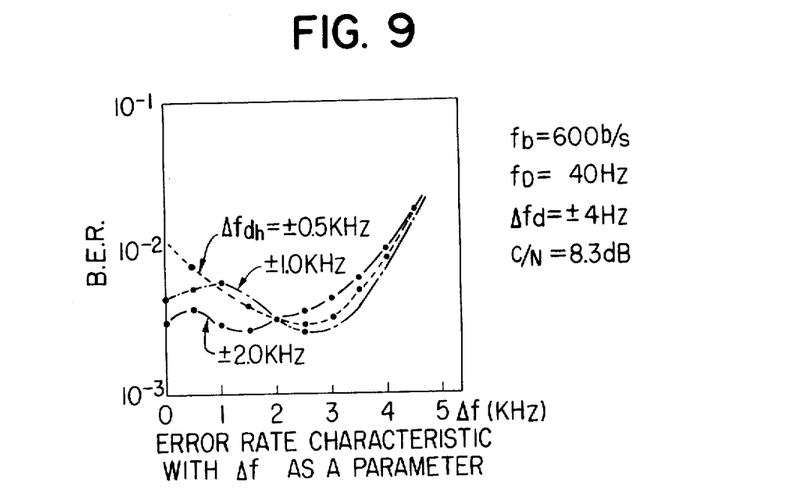
FIG. 9 shows the relationship between the error rate and $\Delta f$.

Results of experiments made by the inventors are shown in FIGS. 7, 8 and 9 wherein $\Delta fd$ is the frequency deviation relative to a rectangular wave of a digital signal; $\Delta fd_h$, the frequency deviation relative to the amplitude of a sinusoidal wave; $f_b$, the signaling speed; and $f_D$, the fading frequency. The fading frequency $f_D = 40$ Hz results from communications with a carrier frequency of 900 MHz and at a vehicle speed of 50 Km/h. C/N is the ratio of the carrier power to the noise power.

FIG. 8 shows the error rate characteristics with $\Delta fd_h$ as a parameter. As compared with the case where no sinusoidal wave is superposed; that is, when $\Delta fd_h = 0$, the received mean signal power required for obtaining a $10^{-3}$ bit-error rate is reduced by approximately 10 dB.

In FIG. 9 the bit-error rate is plotted along the ordinate while the frequency difference $\Delta f$, along the abscissa with $\Delta fd_h$ as a parameter. With $\Delta fd_h = \pm 2$ KHz, the degradation of the error rate may be suppressed within two times even when $\Delta f$ is increased as high as 4 KHz. Frequency stability is $\pm 5 \times 10^{-6}$ in the 800 MHz band. On the other hand, the prior art carrier offset system requires frequency stability as high as $\pm 1 \times 10^{-6}$.

In summary, the first embodiment of the present invention has the feature that as compared with the prior art systems carrier frequency stability may be considerably relaxed by a simple circuit configuration.

Figure 10:
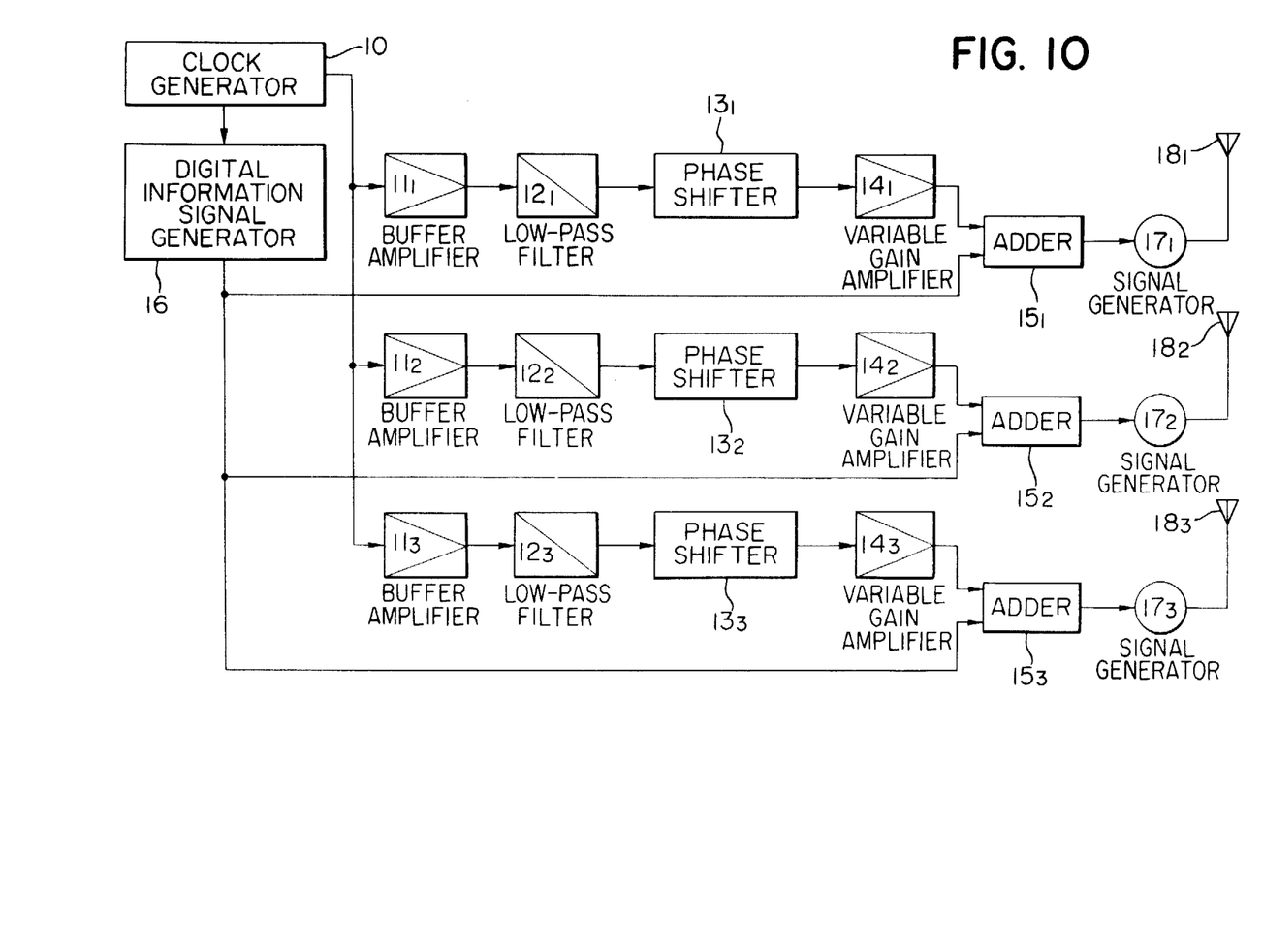
FIG. 10 is a block diagram of transmitters of a second embodiment of the present invention.
Figure 11:
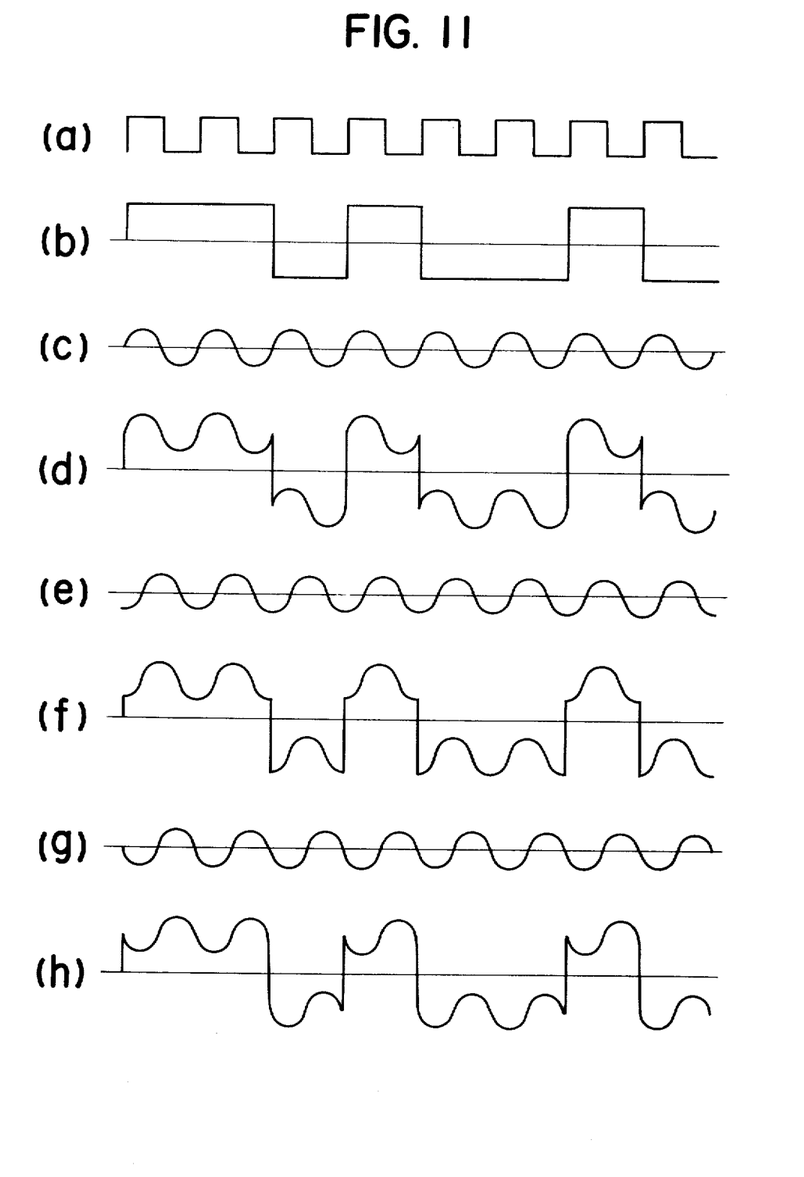
FIG. 11 shows various waveforms used for the explanation of the mode of operation thereof.

In a second embodiment shown in FIG. 10, the sinusoidal waves superposed on the digital information signals in three base stations are out of phase by 120° relative to each other. Furthermore in addition to the first and second base stations in the first embodiment, the second embodiment includes a third base station consisting of a buffer amplifier $11_3$, a low-pass filter $12_3$, a phase shifter $13_3$, a variable gain amplifier $14_3$, an adder $15_3$, a RF generator $17_3$ and an antenna $18_3$. As shown at FIGS. 11(c), (e) and (g), the output sinusoidal waves from the phase shifters $13_1$, $13_2$ and $13_3$ are out of phase by 120° relative to each other so that the outputs as shown at FIG. 11(d), (f) and (h) are derived from the adders $14_1$, $14_2$ and $14_3$, respectively.

The second embodiment may attain the same features and effects as the first embodiment, and the receiver as shown in FIG. 6 may be equally used.

Figure 12:
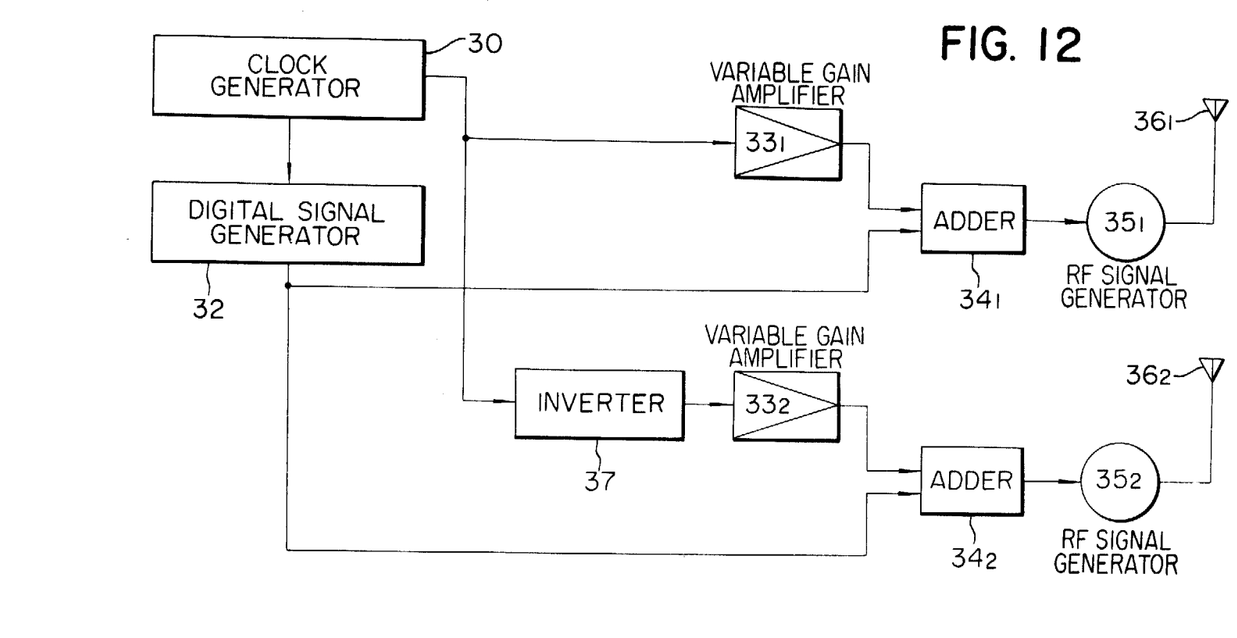
FIG. 12 is a block diagram of transmitters of a third embodiment of the present invention.
Figure 13:
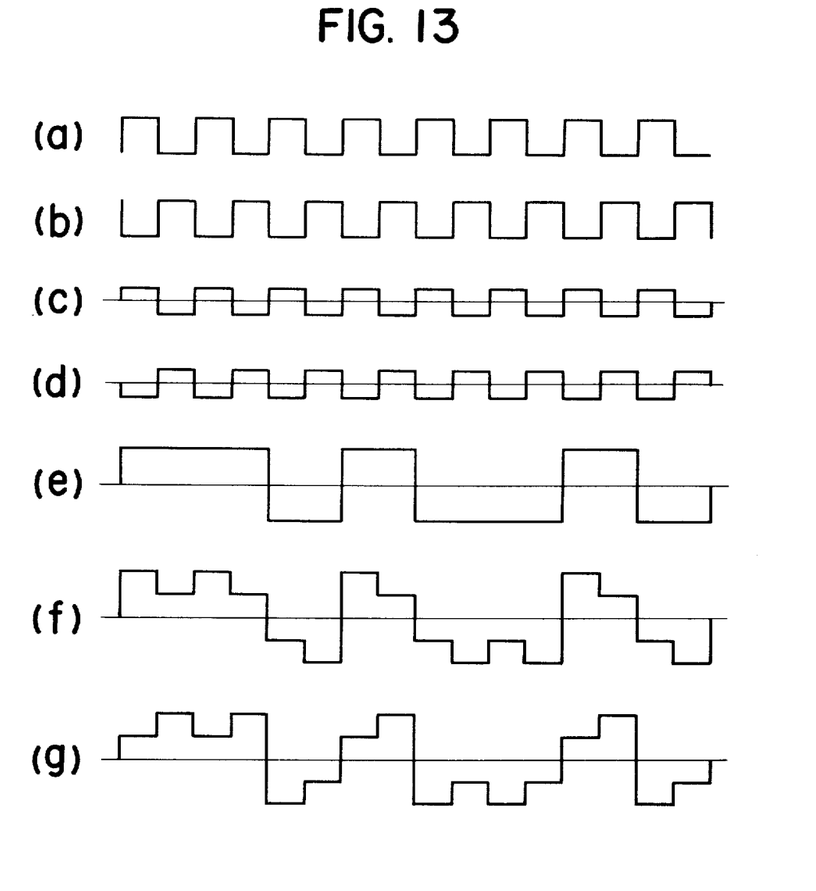
FIG. 13 shows various waveforms used for the explanation of the mode of operation thereof.

Instead of the sinusoidal waves, rectangular waves are also employed as will be described hereinafter as a third embodiment in conjunction with FIG. 12. Clock signals from a clock generator 30 are fed to a variable gain amplifier $33_1$ so that the amplitude is adjusted as shown at FIG. 13(c). The output from the amplifier $33_1$ is fed to an adder $34_1$ and superposed by the output from a digital signal generator 32. The output from the adder $34_1$ as shown at FIG. 13(f) is applied to an RF signal generator $35_1$ for angular modulation, and the output from the signal generator $35_1$ is emitted from an antenna $36_1$.

In a second base station, the clock signals from the clock generator 30 are inverted by an inverter 37 and fed to a variable gain amplifier $33_2$ where the amplitude is adjusted as shown in FIG. 13(d). The output from the amplifier $33_2$ is applied to an adder $34_1$ so that the signal as shown in FIG. 13(f) is derived. The output from the adder $34_1$ is fed to a RF signal generator $35_2$ for angular modulation, and the output from the signal generator $35_2$ is transmitted from an antenna $36_2$. Both the first and second base stations use the same carrier center frequency $f_1$ in the RC signal generators $35_1$ and $35_2$.

The features and effects attainable by the third embodiment with the above construction are substantially similar to those of the first embodiment, but the arrangement may be more simplified.

Figure 14:
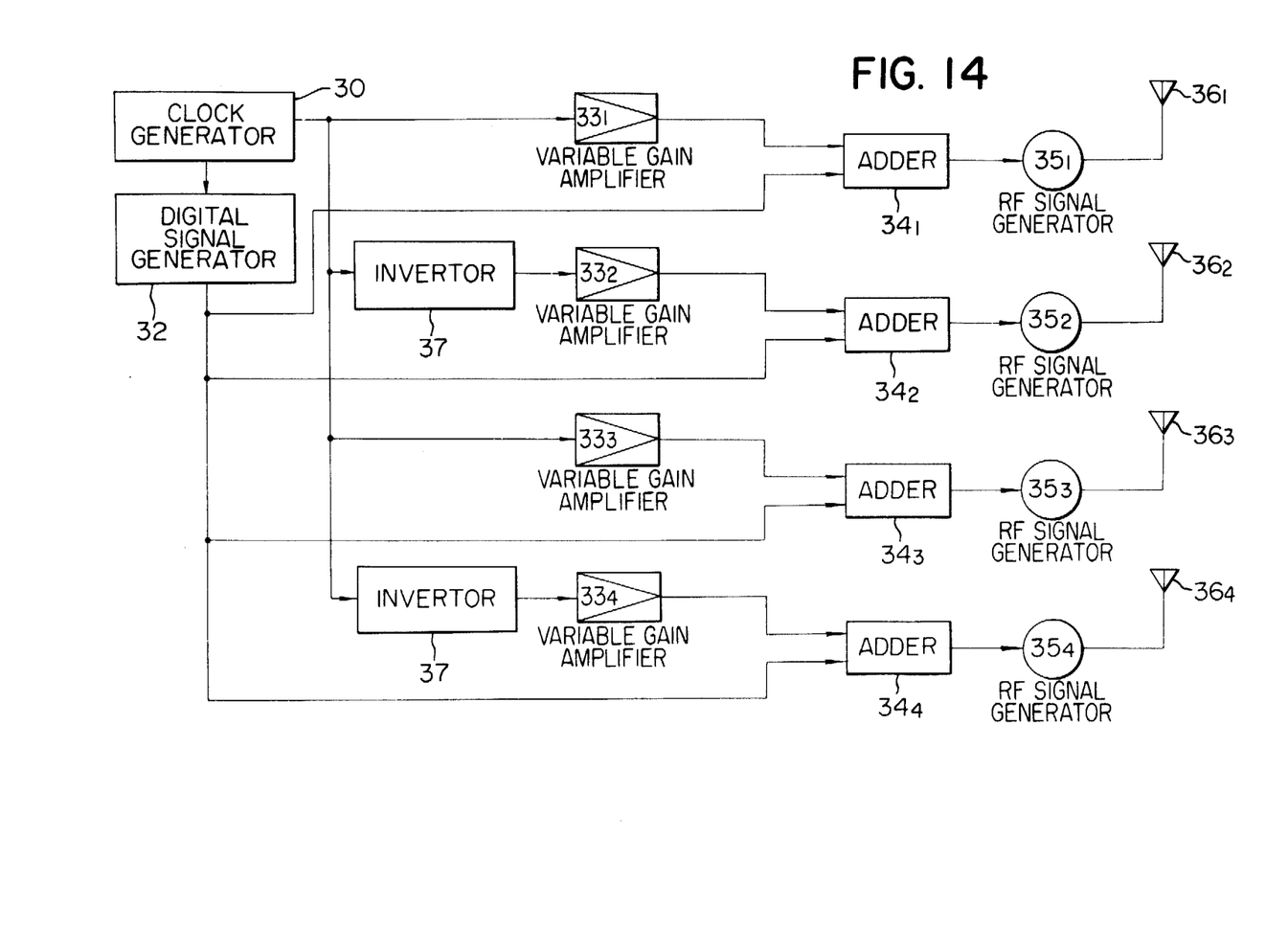
FIG. 14 is a block diagram of transmitters of a fourth embodiment of the present invention.

Next referring to FIG. 14, a fourth embodiment of the present invention will be described which includes a plurality of base stations. That is, the fourth embodiment includes a third base station which is substantially similar in construction to the first base station shown in FIG. 14 except the amplitude of output from a variable gain amplifier $32_3$ is different from the amplitude of the output from the amplifier $32_1$ of the first station. In like manner, a fourth base station is substantially similar in construction to the second base station except that the amplitude of the output from a variable gain amplifier $32_4$ is different from the amplitude of the output from the amplifier $32_2$ of the second base station. Therefore the outputs from the variable gain amplifiers $32_1$, $32_2$, $32_3$ and $32_4$ are different in amplitude.

It is apparent that more than four base stations may be used when the amplitudes of the outputs from the variable gain amplifiers in respective base stations are varied.

As described above, according to the present invention sinusoidal or rectangular waves are superposed on digital information signals within one time slot so that the novel features and effects so far unattainable by the prior art systems are obtained. Furthermore the same features and effects as described above may be obtained when the modulation indexes are varied within one time slot without any modification or conversion of the digital signal waves.

What is claimed is:

1. A multitransmitter digital signaling system, comprising:
   means for supplying digital information signals to a plurality of base station transmitters for one service area, said signals having a multiplicity of successive time slots associated therewith;
   means for supplying clock pulses to said plurality of base station transmitters;
   means at each of said plurality of base station transmitters for converting, the supplied clock pulses into an output wave different from the waves in other base station transmitters;
   adder means at each of said base station transmitters for superimposing on said digital information signals the output wave from the corresponding one of said converting means; and
   angular modulation means at each of said base station transmitters for effecting the angular modulation of a carrier signal by the output from the corresponding one of said adder means at a modulation index having the same value for all of said angular modulation means.

2. A multitransmitter digital signaling system as set forth in claim 1 wherein said converting means comprises a low-pass filter for converting said clock pulses into a sinusoidal wave, and a phase shifter for shifting the phase of said sinusoidal wave.

3. A multitransmitter digital signaling system as set forth in claim 1, wherein said converting means further comprises a variable gain amplifier for adjusting the amplitude of said sinusoidal wave.

* * * * *